Figure 1:
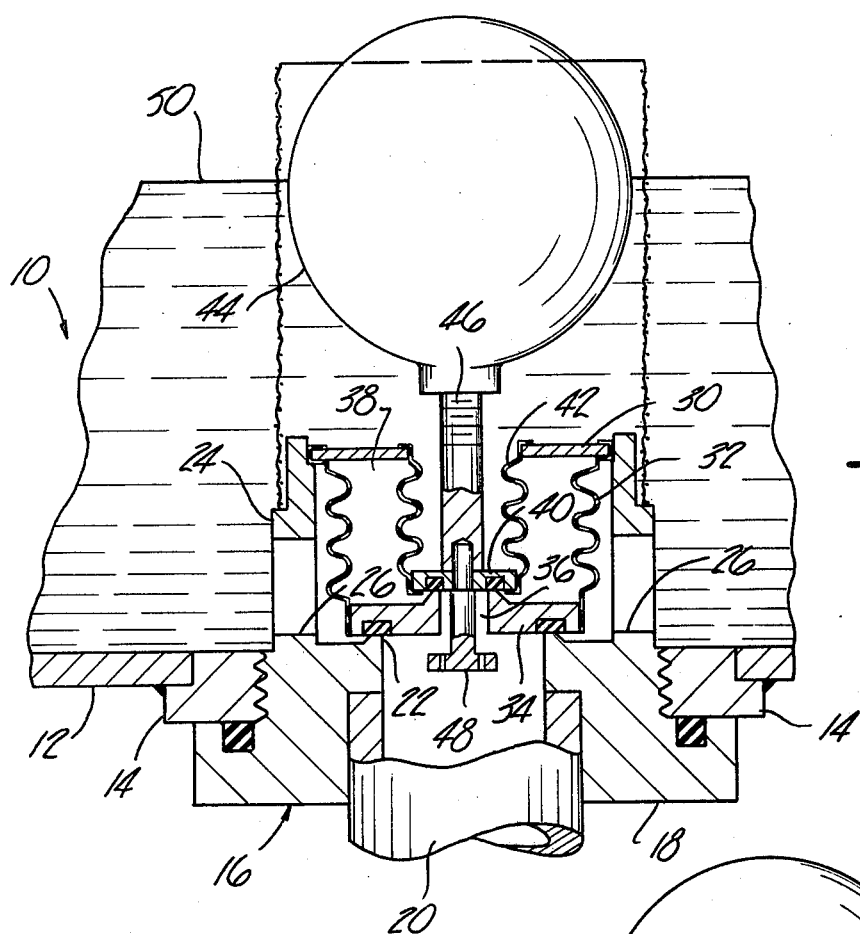

United States Patent [19]

Matta

[11] 4,342,328
[45] Aug. 3, 1982

[54] TWO STAGE FLOAT VALVE

[75] Inventor: Galal N. Matta, Sterling Heights, Mich.

[73] Assignee: The United States of America as represented by the Secretary of the Army, Washington, D.C.

[21] Appl. No.: 806,978

[22] Filed: Jun. 16, 1977

[51] Int. Cl.³ .................. F16L 43/00; F16K 31/18
[52] U.S. Cl. .................................. 137/135; 4/324; 4/405; 4/378; 137/430; 137/433; 137/630.14; 137/630.15; 137/414; 222/67; 251/38; 251/282; 251/335 B
[58] Field of Search ............... 4/52, 58, 57 P, 67 R, 4/378, 391, 394, 395, 324, 405; 137/630.14, 630.15, 429, 430, 433, 414, 135; 222/67; 251/38, 61, 335 B, 281, 282, 45, 46

[56] References Cited

U.S. PATENT DOCUMENTS

| 1,906,277 | 5/1933 | McGee | 137/433 |
| 2,045,653 | 6/1936 | Hoyt | 137/433 |
| 2,511,545 | 6/1950 | Roselair | 137/630.14 |
| 2,625,950 | 1/1953 | Clover | 137/433 |
| 2,996,727 | 8/1961 | Rose | 4/52 |
| 3,196,699 | 7/1965 | Ipsen | 137/630.14 |
| 3,826,465 | 7/1974 | Whittaker et al. | 251/335 B |

FOREIGN PATENT DOCUMENTS

| 571780 | 3/1933 | Fed. Rep. of Germany | 251/38 |
| 62344 | 6/1955 | France | 251/38 |
| 1305801 | 11/1961 | France | 137/630.14 |

Primary Examiner—George L. Walton
Attorney, Agent, or Firm—Peter A. Taucher; John E. McRae; Nathan Edelberg

[57] ABSTRACT

A normally-open two stage float valve for use with a suction tube leading from a vehicle fuel tank. As the fuel tank begins to run dry it is desired that the float valve close off the tank to the suction force. The valve of this invention includes a float-operated pilot valve element that equalizes forces on the opposite faces of the main valve element as the float moves through its actuation stroke. A lifting head is associated with the pilot valve element for mechanically lifting or lowering the main valve element relative to the main seat when the forces have been equalized.

3 Claims, 2 Drawing Figures

U.S. Patent    Aug. 3, 1982    4,342,328

TWO STAGE FLOAT VALVE

The invention described herein may be manufactured, used, and licensed by or for the Government for governmental purposes without payment to me of any royalty thereon.

BACKGROUND AND SUMMARY OF THE INVENTION

Tracked military vehicles (tanks) sometimes have multiple fuel tanks for such purposes as quicker filling from multiple nozzles, and redundant fail-safe action during enemy attack. In such multiple fuel tank systems the fuel pump(s) draw fuel out of the tanks through suction tubes connected to the tank bottom walls. Should a tank start to run dry it is necessary to close that tank to the suction force; otherwise air flowing from the empty tank into the suction line may prevent the fuel pump from drawing fuel out of the other tanks.

The present invention contemplates the use of a float-operated valve in each tank to close that tank to the suction tube as the liquid level in the tank gravitates down to a predetermined low value, e.g. one inch above the tank bottom wall. A feature of the valve is a pressure-equalization structure that precludes the tube suction from adversely affecting the valve operation. This pressure-equalization feature reduces the size of the float necessary to close or open a given size suction tube.

THE DRAWINGS

Figure 2:
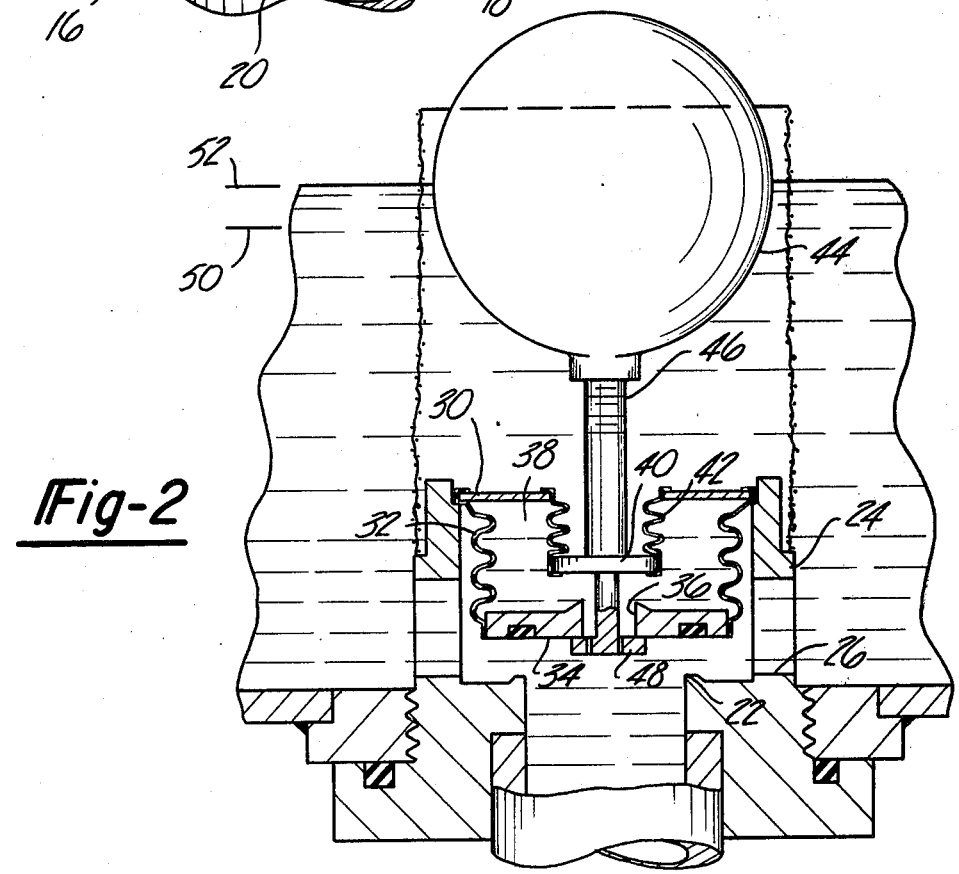

FIGS. 1 and 2 are fragmentary sectional views of a valve incorporating this invention, taken with the valve in its closed and open positions in the different FIGS.

The drawing fragmentarily illustrates a vehicle fuel tank 10 having a bottom wall 12 equipped with an internally threaded fitting 14 that detachably mounts a float valve assembly 16. The valve assembly includes a screw-machine component 18 that defines a socket-like receptacle for the end of a suction tube 20; a compression type connector (not shown) may be used to join and seal the tube to component 18. When tube 20 is detached from component 18 the float valve assembly 16 can be unscrewed from fitting 14 and removed downwardly through the defined opening. A reverse procedure is used to initially install and mount the float valve assembly on the fuel tank.

In service the suction tube 20 connects to a non-illustrated fuel pump that draws fuel (gasoline or diesel oil) from the tank into tube 20 for eventual admission to the engine. Component 18 includes a main valve seat 22 and an upstanding annular wall 24 having large flow passages 26 drilled therethrough. The upper edge area of wall 24 constitutes a mounting surface for an annular stationary plate or end wall 30; staking or other means can be used to mount wall 30 in a stationary position on component 18.

Wall 30 is connected to a flexible bellows 32 whose lower end is suitably joined to a poppet valve element 34. As will be seen from a study of FIGS. 1 and 2, valve element 34 moves toward or away from seat 22 to interrupt or not interrupt fuel flow from tank 10 into tube 20. The rate of fuel flow is determined by fuel pressure regulator means not part of this invention.

Main valve element 34 is formed with a central pilot port 36 that communicates the space circumscribed by seat 22 with the chamber space 38 circumscribed by bellows 32. When pilot valve elements 40 is raised away from pilot port 36 (FIG. 2) liquid fuel can flow through the port into or out of chamber 38. A second bellows 42 seals the joint between valve element 40 and chamber end wall 30. The valve element is connected to a float 44 via stem 46. Element 40 carries a lifter head 48 in the space below main valve element 34.

FIG. 2 illustrates the valve assembly in the open condition wherein the liquid level in tank 10 is above the "actuation" level which causes the tank to be shut off from suction tube 20. In the FIG. 2 condition of the assembly port 36 exposes chamber 38 to the suction existing within tube 20. However essentially the same negative pressure condition exists above and below valve element 34. Therefore the tube suction does not draw valve element 34 down against seat 22. Float 44 is in a buoyant condition whereby the connected lifter head 48 holds valve element 34 away from seat 22; velocity pressure associated with liquid flow through seat 22 also assists in holding element 34 away from seat 22.

As the tank liquid drops to the so-called actuation level 50 the pilot valve element 40 moves downwardly into engagement with port 36. Velocity pressure of the flowing liquid maintains valve element 34 away from seat 22, so that element 40 is able to close port 36 as the first stage in the two stage flow shut-off process. When port 36 is closed by pilot element 40 the chamber 38 is isolated from the suction condition below main valve element 34. The absolute pressure on the upper face of element 34 becomes significantly greater than the pressure on the element 34 lower face. Tube 20 suction is then able to draw element 34 down onto seat 22 as shown in FIG. 1.

During any refilling of the tank from a nozzle (not shown) the tank liquid level gradually rises from its low value 50. As the liquid level rises to some suitable valve 52 (dependent on the size of float 44 in relation to the size of port 36) the float is buoyed upwardly to draw element 40 away from port 36. Liquid thereby flows through port 36 out of chamber 38, thereby equalizing the pressure across opposite faces of element 34. Thereafter the lifter head 48 forcibly strikes valve element 34 to lift it away from seat 22; the fluid pressure-equalizing action on the upper and lower faces of element 34 enables head 48 to perform its lifting function. As element 34 moves away from seat 22 tank liquid is allowed to move past head 48 and through port 36 into chamber 38.

The illustrated valve construction is advantageous in that float 44 needs to be only large enough to operate pilot valve element 40 against the relatively small load resistance offered by pilot port 36. For a given size main valve 34 a relatively small float can be employed.

I claim:

1. In a vehicle having a liquid fuel tank whose bottom wall (12) is connected to a downwardly-extending suction tube (20): the improvement comprising means defining a main valve seat (22) located at the upper end of the suction tube; a main poppet valve element (34) disposed above the main seat for movement toward or away therefrom to control fuel flow thereacross; a stationary end wall (30) located above the valve seat; a first outer imperforate bellows 32 extending downwardly from said end wall to the main valve element;

said main valve element having a pilot port (36) therethrough; a liquid-level responsive float (44) located within the fuel tank directly above the stationary end wall; a pilot valve element (40) rigidly connected to the float for opening the pilot port when the liquid level in the tank rises above a predetermined low value; valve lifter means (48) carried by the pilot valve element for forcible engagement with an undersurface of the main valve element when the pilot valve element is moved upwardly by the float; and a second inner imperforate bellows extending downwardly from the stationary end wall to the pilot valve element;

the inner and outer bellows collectively forming an annular chamber (38) whose sole communication with the fuel tank is through the pilot port.

2. The improvement of claim 1 wherein the stationary end wall and main valve seat are constructed as a unitary structure that can be installed in the fuel tank or removed therefrom in a single assembly-disassembly operation; the main valve element, pilot valve element and float being mounted on said unitary structure and thus movable therewith during assembly-disassembly operations.

3. The improvement of claim 2 wherein the stationary end wall is connected to the main valve seat by means of an annular upstanding wall (24); said upstanding wall having flow passage opening (26) for communicating the fuel tank with the main valve seat.

* * * * *